United States Patent
Bose et al.

(10) Patent No.: US 8,100,318 B1
(45) Date of Patent: Jan. 24, 2012

(54) JOINING OF TUNGSTEN ALLOYS

(75) Inventors: Animesh Bose, Fort Worth, TX (US);
Morris F. Dilmore, Baker, FL (US);
Alan J. Armstrong, Fort Walton Beach, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 18 days.

(21) Appl. No.: 12/703,815

(22) Filed: Feb. 11, 2010

(51) Int. Cl.
*B23K 20/00* (2006.01)
(52) U.S. Cl. .......................... 228/194; 228/193
(58) Field of Classification Search .................. 228/193, 228/194
See application file for complete search history.

(56) References Cited

U.S. PATENT DOCUMENTS

| | | | |
|---|---|---|---|
| 4,736,883 A * | 4/1988 | Morgan et al. | 228/194 |
| 2004/0050912 A1* | 3/2004 | Spencer | 228/194 |
| 2008/0008616 A1* | 1/2008 | Liu | 419/49 |
| 2009/0139858 A1* | 6/2009 | Nakamura et al. | 204/298.13 |

* cited by examiner

*Primary Examiner* — Jessica L Ward
*Assistant Examiner* — Nicholas D'Aniello
(74) *Attorney, Agent, or Firm* — AFMCLO/JAZ; Fredri Sinder

(57) ABSTRACT

A process of making useful shapes by joining of tungsten alloys. Joining of tungsten heavy alloys which are alloys typically made from W—Ni—Fe is used. These alloys are typically manufactured by liquid phase sintering. This leads to difficulty in producing large length to diameter ratio parts that have some significant weight (such as penetrators). A "brick and mortar" approach is employed wherein smaller segments of this alloy (low length to diameter ratio) are joined to together to produce a larger part with higher length to diameter ratio.

2 Claims, 1 Drawing Sheet

JOINING OF TUNGSTEN ALLOYS

RIGHTS OF THE GOVERNMENT

The invention described herein may be manufactured and used by or for the Government of the United States for all governmental purposes without the payment of any royalty.

BACKGROUND OF THE INVENTION

The invention relates to a process of making useful shapes by joining of tungsten alloys. The quest for a high-density material having a unique combination of high strength and ductility, high modulus, and good corrosion resistance, resulted in the development of a class of alloy known as "tungsten heavy alloys." Though there are several other high-density metals, none of them can rival tungsten in terms of high density and affordability. Some of the comparable high-density materials are either noble metals and are either extremely expensive or are toxic to the environment (gold, platinum, osmium, uranium, rhenium). Thus, tungsten is usually the material of choice for applications that require high density, such as kinetic energy penetrators, radiation shields, counterweights, etc. The solution to the problem of producing a high-density alloy from tungsten at a reasonable cost was first suggested to Smithells by Sir John Mclennan [1,2]. The sintering of pure tungsten, however, would require very high temperatures that would make the process very expensive. The problem was solved by mixing tungsten powder with a small proportion of a lower melting metal to form a liquid phase when heated to a moderate temperature. The metal additive would have to wet the tungsten particles, which would then result in shrinkage and attainment of near full density. Copper and nickel were chosen as the early additives (90W-5Ni-5Cu), and then sintering it in a hydrogen atmosphere at 1450° C. resulted in the desired material. The density of the finished piece was between 16.3 to 16.5 g/cc. The new alloy, therefore, had a density that was approximately 50% greater than that of lead and tensile strengths around 40 t/in$^2$ and a tensile elongation of 4%.

There was soon an explosive growth in the research and development activities with tungsten heavy alloy systems. Once it was realized that this alloy had tremendous potential in defense related applications due to its high density and relatively low cost, a great deal of government funding spurred the continued processing improvements with this alloy system. It soon became clear that the properties of these alloys were greatly affected by numerous factors, especially the processing. Another important development was the unification of the alloy systems with W—Ni—Fe becoming the most popular tungsten heavy alloy with the nickel to iron ratio of 7:3 or 8:2 exhibiting optimum properties.

Typically, tungsten heavy alloys are two phase composites which normally consist of almost pure body centered cubic (bcc) tungsten grains embedded in a comparatively soft and ductile face centered cubic (fcc) matrix alloy. In conventional heavy alloys the tungsten content varies from 90 to 98 weight percent. Commonly the remaining alloy constituent usually contains nickel, iron, cobalt, and copper (usually a minimum of two elements are used, e.g. Fe:Ni, or Ni:Cu). The most popular additive being the nickel and iron in the ratio of 7Ni:3Fe or 8Ni:2Fe (weight ratio). The conventional means of processing the tungsten heavy alloys include the mixing of the desired amount of the elemental powders, cold pressing, followed by liquid phase sintering to almost full density. During liquid phase sintering, the matrix alloy melts and takes into solution some tungsten, resulting in a microstructure in which relatively large tungsten grains (20 to 60 11μ) are uniformly dispersed in a matrix alloy. This alloy usually is comprised of nickel and iron that has taken into solution some tungsten. Currently conventional tungsten heavy alloys exhibit a property combination that is unique. Properly processed material exhibits a combination of high density greater than 17 g/cc for a typical 90 weight percent tungsten containing alloy, high strength (often as high as 800 to 1000 MPa), high ductility ranging from 10 to 30%, good corrosion resistance, high radiation absorption capability, and reasonably high toughness. This unique combination of properties has made this alloy a candidate for both defense and civilian applications. Some of its applications include radiation shields, counter weights, kinetic energy penetrators, vibration dampening devices, several medical devices for containment of radioactive isotopes, heavy duty electrical contact materials, balancing crankshafts for internal combustion engines used in racing motor cars, gyroscopes, and targeted weights in golf club heads and putters.

Though the early work on this alloy system dates back to the 1930's, the tremendous interest in this alloy system was precipitated due to the possible use of this alloy in defense related applications. During the last quarter of this century, two distinct trends emerged, which had a major impact on the processing strategies adapted for producing tungsten heavy alloy parts. Tungsten heavy alloys were in direct competition with depleted uranium for use as kinetic energy penetrators. Work at the Argonne Research Laboratory showed that the superior properties of depleted uranium were a result of its ability to localize shear during ballistic penetration events. Thus, it was argued that if localized shear can be imparted to tungsten heavy alloys, these alloys would exhibit penetration performance that would match that of depleted uranium, an environmentally sensitive material. A tremendous spurt of research ensued in finding a heavy alloy that would be prone to adiabatic shear. The search for this ideal heavy alloy composition and processing combination resulted in several interesting processing strategies which includes processes such as solid state sintering, powder extrusion, coating of tungsten powders with the matrix materials, and the use of a tungsten heavy alloy core coated with an adiabatic shear prone alloy. The other important processing strategy was born out of the need for producing complex shaped tungsten heavy alloy parts. The commercialization of the technique of powder injection molding resulted in tremendous interest in the processing of these alloys into near net shapes. To address the problem of high strength heavy alloys without subjecting the material to a thermo-mechanical processing step, new alloys were developed. In these new heavy alloys, a part of the tungsten weight fraction was replaced by other refractory metals such as molybdenum, or rhenium which increased the strength of the alloys without the thermo-mechanical processing step.

Tungsten heavy alloys have some unique applications that require fabrication of very large (hundreds of kilogram) shapes such as hollow conical, hollow cylindrical, or even a one face open box-like structure. Processing of such shapes as one piece is usually very difficult and sometimes impossible. The problem stems from the basic manner by which the excellent properties of these alloys are achieved, which is by liquid phase sintering. During liquid phase sintering, a part of the structure becomes a liquid (volume being dependent on the composition and the processing conditions). If the structure has a large mass on top, it results in gravity induced slumping leading to distortion at the bottom of the structure, often termed as "elephant foot syndrome."

The problem stems from the separation of the solid and liquid due to gravity somewhat like the segregation of water and sand particles. This gravity induced slumping has been the subject of several interesting research papers that also includes microgravity sintering. This behavior of liquid phase sintered materials creates a great deal of difficulty in the production of large liquid phase sintered tungsten heavy alloy structures in the normal gravity bound environment. Thus, to manufacture very large tungsten heavy alloy parts in a cost effective manner (without the aid of microgravity), the only solution seems to be the joining by high temperature diffusion bonding of smaller tungsten heavy alloy pieces to build up a very large component.

Some of the well known joining techniques that have been outlined in the literature include mechanical fastening, welding, brazing, adhesive bonding, reaction bonding, and soldering. These processes and some of their associated problems are extensively described in the open literature. In the case of tungsten heavy alloy joining, the need for attaining the parent material properties as well producing structures having a large mass (hundreds of kilograms) without significant slumping makes the technical issues far more challenging than normal joining related problems. The use of pressure assistance, which aids in the creation of a good joint, may not be a problem in the case of joining large pieces of tungsten heavy alloys, as the weight of the top heavy alloy piece will often be quite large and will provide significant pressure at the joint interface. Thus, the primary need is to provide at the interface certain material(s) that will provide a rapid diffusion path for tungsten/nickel/iron. The short circuit diffusion path could be aided with the formation of a thin layer of liquid at the interface. The key to the success was the choice of a temperature high enough to allow significant diffusion across the joint interface but definitely lower than the temperature that would cause melting in the parent tungsten heavy alloy structure.

The manufacturing of very large tungsten alloy components made by liquid phase sintering as one single piece is not technically feasible. Thus, joining of relatively smaller heavy alloy pieces to form a very large part is an attractive manufacturing route. In this latter method the smaller heavy alloy pieces can be liquid phase sintered because the mass is not too great to cause slumping, and then the subsequent joining has to be carried out at a temperature that does not exceed the solidus temperature of the heavy alloy pieces that are to be joined. This ensures the avoidance of the liquid phase and the concomitant slumping effect. The material that is used to join the pieces of liquid phase sintered heavy alloys can, however, be a liquid or remain solid at the joining temperatures.

One of the main criteria for the joining material is that it should have good solubility for tungsten and forms a strong interface so as to withstand launching. The U.S. Department of Defense has a need for the fabrication of such large tungsten alloy penetrators suitable for destroying buried concrete bunkers and deep down trenches. Currently the technology to manufacture such large penetrators in an economical manner is not available. This invention discloses the feasibility for the fabrication of these large tungsten alloy parts by joining smaller liquid phase sintered tungsten heavy alloy pieces.

This joining can be accomplished by several means. One of the techniques is to have a foil made of the desired composition. The choice of the materials has to be based on fundamental metallurgical concepts. The materials chosen have to impart good interfacial strength as well as have solubility for the tungsten to allow rapid diffusion of tungsten across the interface. The joining materials can have joint thickness typically below 100 µm. It is usually good to have a material with a melting point that is at least 100° C. lower than the parent heavy alloy pieces. Thus, this joining alloy when heated to a temperature above its melting point but below the melting point of the parent heavy alloy pieces being joined will form a liquid phase at the interface only without any melting of the remaining structure.

Other methods of joining include sputtering thin layers of a special alloy on the flat faces of a heavy alloy cylinder that needs to be joined, using sequential depositions of elements such as Cu and Ni by an electrolytic process or electrolysis process. Another method used involves the thermal evaporation of the desired composition on the flat surface of the heavy alloy cylinders to be joined. Investigation indicates the feasibility of producing large structures of tungsten heavy alloys using the technique of joining of smaller pieces together by high temperature diffusion bonding using foils, sputtering, and thermal evaporation. The uses of these structures can be used in radiation shields, smaller joint structures for the oil and gas industry, and of course in large penetrators.

SUMMARY OF THE INVENTION

It is an object of this invention to form a large tungsten heavy alloy part having a high length to diameter ratio (typically 2 or more).

Another object of this invention is to make the above part by joining short (length to diameter ratio 1 or lower) pieces of liquid phase sintered tungsten heavy alloys using a layer of material at the joint surface that will promote significant diffusion or activated sintering across the joint area and create a strong bond that would approach some of the properties of the tungsten heavy alloy pieces that are being joined to form the final high length to diameter ratio part.

Another object of this invention is to have the joining material prepared from one or more of the following elements: W, Ni, Fe, Cu, B, Mo, Ta, Pt, Re, and Pd.

A further object of this invention is to provide the desired joining material composition at the joint surfaces through the use of surface coating of the tungsten heavy alloy pieces using techniques such as sputtering, thermal evaporation, plasma, electron beam vaporization, etc.

A further object of this invention is to provide the desired joining material composition at the joint surfaces through the use of foil(s) made by suitable techniques such as rolling of a cast or powder metallurgically formed ingots, surface coating of the tungsten heavy alloy pieces using techniques such as sputtering, thermal evaporation, plasma, electron beam vaporization, etc.

A further object of this invention is to provide the desired joining material composition at the joint surfaces through the application of powder or powder mixes at the joining surface through the use of techniques similar to painting.

A further object of this invention is to provide the desired thermal energy for the joining process through the use of an industrial furnace.

A further object of this invention is to carry out the joining of the tungsten heavy alloy pieces at a temperature that is at least 10 to 100 degrees centigrade lower than the first liquid forming temperature of the tungsten heavy alloy pieces that are being joined.

A further object of this invention is to carry out the joining of the tungsten heavy alloy pieces using localized heating at the joint surfaces though techniques such as induction heating, electron beam heating, IR heating, and microwave heating.

A further object of this invention is to carry out the joining of the tungsten heavy alloy pieces in an industrial furnace where during the heating cycle, the furnace atmosphere is preferably reducing (hydrogen) or a mixture of reducing/inert gas.

A further object of this invention is to containerless hot isostatically press the final large tungsten heavy alloy part after joining to remove microporosity at the joint area.

DETAILED DESCRIPTION

The first process relies on obtaining targets (similar to sputtering targets) of the desired compositions, which can be used on a machine that can do sputtering or thermal evaporation. Sputtering is of course a slower process while the process of thermal deposition results in a fast rate of deposition of the desired material. The demonstration has been carried out with the thermal evaporation process. Targets can be made from a variety of different compositions containing the following elements:

W, Ni, Fe, Cu, B, Mo, Ta, Pt, Re, and Pd.

For demonstration purposes, two targets were used for the coating work with compositions of:

64Ni-32Cu-4Mo (weight percent)
62Ni-36Cu-2Fe (Weight percent)

For the coating, the lapped face of tungsten heavy alloy cylinders having a composition of 90W-7Ni-3Fe alloy (1.5 inch diameter and 1.5 inch high) was placed in a special chamber. The alloy faces were cleaned prior to coating. Thermal evaporation was used to coat one of the lapped faces of each of the cylinders. Before the actual coating, the face of the sample to be coated was first plasma etched for 2 minutes. The actual coating was started after that. The coating was by thermal evaporation of the target material and its subsequent deposition on anything that is placed below the target material.

Two 1.5-inch diameter tungsten heavy alloy samples were coated for using the Ni—Cu—Fe target. Two 1.5-inch diameter tungsten heavy alloy samples were coated using the Ni—Cu—Mo target.

A one coated sample 1.5-inch diameter tungsten heavy alloy sample coated with the Ni—Cu—Fe target was placed on the bottom of the furnace floor. The coated face was on top. Another sample of 1.5-inch diameter tungsten heavy alloy that was coated using the same Ni—Cu—Fe target was then placed on top of the other sample, with the coated face of this sample at the bottom i.e. butting against the coated face of the other sample. A pre-machined ceramic sleeve, which has an inner diameter slightly greater than 1.5 inch is placed around the laid up cylinders. A similar arrangement was used to build the other joint segments using the Ni—Cu—Mo at the interface.

Figure 1:
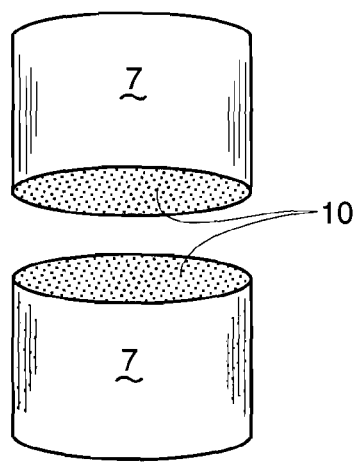
FIG. 1 shows the faces 10 of two Ni—Cu—Fe coated samples that will butt against each other during the joining process.
Figure 2:
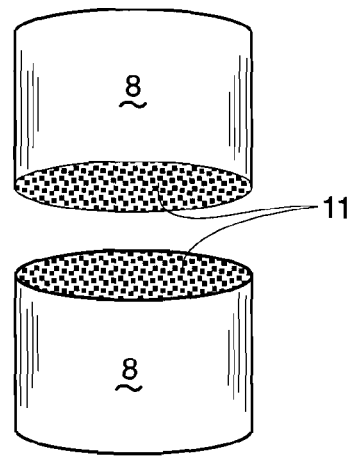
FIG. 2 shows the faces 11 of the two Ni—Cu—Mo coated samples that will butt against each other during the joining process.

FIG. 1 shows the faces 10 of the two Ni—Cu—Fe coated samples 7 that will butt against each other during the run. FIG. 2 shows the faces 11 of the two Ni—Cu—Mo coated samples 8 that will butt against each other during the run.

The time-temperature profile used to join all the set of samples is given below:

Time-temperature profile for bonding run at 1400° C.:
Room temperature to 1000° C. at 10° C./min (in dry hydrogen):
Hold at 1000° C. for 1 hour (after half an hour hold change to wet hydrogen by passing the gas through a bubbler);
From 1000° C. to 1400° C. at 5° C./min (in wet hydrogen);
Hold at 1400° C. for 2.5 hours (in wet hydrogen);
From 1400° C. to 1200° C. at SOC/min (in wet hydrogen; changed to dry hydrogen at end);
From 1200° C. to 1000° C. at 10° C./min (in dry hydrogen; switched to dry nitrogen at end);
Hold at 1000° C. for 1 hours (in dry nitrogen)
Furnace Cool to room temperature in dry nitrogen.

The joined samples were subsequently containerless hot isostatically pressed using the following conditions:

HIP conditions: HIP at 2380° F. for 1 hour using a pressure of 15,000 psi.

Samples from the joined sections were cored out, machined into tensile bars and tested. The properties proved to be quite good with an excellent combination of strength and tensile elongation.

Some of the conditions that were varied during the investigation include other compositions of the joint area, different joint layer thickness, different temperature for joining, different hold time for joining, etc. These have been used to process the optimum joining technique for these heavy alloys. Thus, the process outlined can be used to form large components using smaller segments of tungsten heavy alloy.

Figure 3:
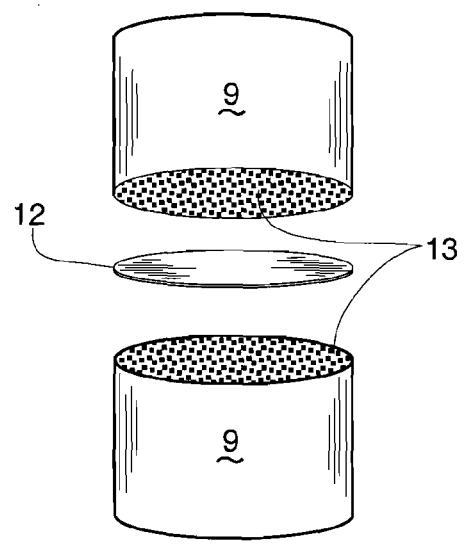
FIG. 3 shows the process of placing foils between the surfaces to be joined.

Another process that can be used is to have special materials of the desired composition cast or made by a powder metallurgy approach as shown in FIG. 3. These can then be prepared into foils 12 of the desired thickness. As shown in FIG. 3 these foils 12 can then be placed between the two mating surfaces 13 of the tungsten alloy segments 9 that need to be joined. Thus, the foil is actually sandwiched between the two segments to be joined. This complete set up is then heated to the desired temperature for joining.

Another process that can be used is a combination of the foil and coating approach. The heavy alloy segments can be first coated with the desired material. In addition, a separate foil of another material composition can be introduced between the coated heavy alloy segments to obtain a unique layered joint structure. The foil 12 is of a suitable composition that is placed between the two coated segments 13.

These are the faces of the two coated samples that will butt against each other during the run.

Another processing approach would be use of a foil that can be modified by some other approach such as coating of other elements or compounds on the foil itself. For example, a copper foil may be electrolytically coated with nickel-boron or a nickel foil may be coated with copper, or a nickel-iron foil may be coated with copper and then with sputtered palladium, etc. It can be imagined that different composition of the joint area and the ways of applying the different compositions to the joint area may be varied by people trained in the art. This type of joining can be used to make penetrator structures with large length to diameter ratios.

These combination of joint compositions and processing can be used not only to produce joint structures which will have excellent joint strength and ductility, but can also be tailored to intentionally produce a weaker joint (a joint that has significantly lower strength compared to the parent structure) where the failure Is induced through the joint only for various applications.

Heretofore, ways to join tungsten alloys have been disclosed, specifically liquid phase sintered tungsten heavy alloys, to form large parts with high length to diameter ratio.

These parts have application as penetrators that can penetrate through deep dug bunkers maybe with concrete reinforcements. The main requirement of these alloys is the density but additional minimum requirements of strength and ductility is also important for surviving the launch and staying intact during the flight path. Though to the best of the inventors' knowledge, there is no specific numbers for the minimum strength and ductility requirement for the penetrator, a minimum value of these can be assumed which would allow the launch of the penetrator and let it remain intact till it hits the target.

One of the major concerns is always the ductility of the joint area, which has been quite low (less than 50% of the ductility of the parent alloy or less than 10%). Often, as the joint ductility is improved, the strength of the joint area is drastically reduced. However, with the method and compositions that have been used in this invention, it has been possible to consistently obtain joint strengths greater than 125,000 psi and elongations greater than 10%. These properties can be considered adequate for both launch and the penetrator remaining intact until it hits the target. Between the two properties the ductility is one that needs to be carefully controlled. Though 10 to 15% tensile elongation at room temperature may be more than adequate, it is always better if greater ductility is achieved.

The room temperature tensile elongation of parts joined so far (for the optimized processing and composition) has been on average around 18%. However, the strength values have been consistently high (greater than 125,000 psi). One of the best ways of increasing the tensile elongation at the expense of strength is to take the material to a slightly elevated temperature. This was tried with the joined structures. Tensile property measurement at a low and high temperature was carried out on Joints with optimal composition and processing conditions. Table 1 givens the tensile properties of the joints sintered at room temperature, at −50° C., and at +150° C. It can be noted that the strength of the joint is highest when the material was tested at a temperature of −50° C. but was lowest at a temperature of +150° C. The trend is reversed for elongation with the highest values being obtained when the test temperature was +150° C. The average elongation value when tested at a temperature of +150° C. was 26% while the strength was around 110,000 psi. It is postulated that the strength of 110,000 psi and elongation of 26% is enough to hold the penetrator together after launch.

The recommended procedure for the use of these joined penetrators would be to have the penetrators pre-heated to a temperature in the range of 50° C. to 80° C. before launching. This is an important step which will ensure that the joint ductility, even if slightly low, will be more than compensated by ensuring an elevated temperature before its use. For penetrators with the explosives already loaded it may not be a good idea to heat them to temperatures over 100° C., but certainly going to around 60 to 80° C. may be a possibility. It is expected that even these modest temperatures would provide a significant gain in ductility which would be beneficial.

TABLE 1

Mechanical properties of joined and parent tungsten heavy alloys.

| Sample | Joint Alloy composition (weight percent) | Test Variables | YS ksi | UTS ksi | Elongation % | E Mpsi |
|---|---|---|---|---|---|---|
| BB1/BB2* 1 | 61.6Ni—36.7Cu—1.7Fe | Tested at room temperature | 96.2 | 134 | 24 | 30.4 |
| BB1/BB2 2 | 61.6Ni—36.7Cu—1.7Fe | Tested at room temperature | 95.8 | 314.2 | 22 | 29.8 |
| BB3/BB4 1 | 61.6Ni—36.7Cu—1.7Fe | Tested at room temperature | 94.4 | 133.1 | 16 | 32 |
| BB3/BB4* 2 | 61.6Ni—36.7Cu—1.7Fe | Tested at room temperature | 92.7 | 130.8 | 25 | 30.1 |
| TT1/TT2 1 | 61.6Ni—36.7Cu—1.7Fe | Sand blasted, Test Temperature −50° C. | 115.1 | 139.6 | 7 | 34.9 |
| TT1/TT2 2 | 61.6Ni—36.7Cu—1.7Fe | Sand blasted, Test Temperature −50° C. | 117.7 | 134.3 | 6 | 37.4 |
| TT3/TT4 1 | 61.6Ni—36.7Cu—1.7Fe | Sand blasted, Test Temperature −50° C. | 118.3 | 142.1 | 1 | 37.1 |
| TT1/TT2 3 | 61.6Ni—36.7Cu—1.7Fe | Sand blasted, Test Temperature +150° C. | 63.9 | 109.7 | 27 | 21.8 |
| TT3/TT4 2 | 61.6Ni—36.7Cu—1.7Fe | Sand blasted, Test Temperature +150° C. | 63.0 | 109.9 | 23 | 22.3 |
| TT3/TT4 3 | 61.6Ni—36.7Cu—1.7Fe | Sand blasted, Test Temperature +150° C. | 64.7 | 111.2 | 28 | 23.6 |

*These samples failed not at the joint but away from it.

Impact Properties

It was determined from the Phase I investigation that the impact properties of the joined tungsten heavy alloys were significantly lower than the parent tungsten heavy alloy. Since tungsten heavy alloys are also very notch sensitive, their properties are typically determined by carrying out unnotched Charpy tests. Generally, the smooth bar impact properties of tungsten heavy alloys range from 20 to 150 ft-lbs, while the notched impact properties are typically in the range of 2 to 3 ft-lbs. It was decided that the smooth (unnotched) bar impact properties would be carried out on the parent tungsten heavy alloy bars and on the joined tungsten heavy alloy rods. Phase I investigation results were extremely poor (typically the joined tungsten heavy alloy properties studied in Phase I was around 30 times lower compared to the parent tungsten heavy alloy). Thus, there was not too much hope that the properties would be significantly better. However, in Phase II, since the joint properties have been optimized, it was decided to try and carry out the smooth (unnotched) bar Charpy impact testing on these parts.

For the testing, it was decided that sub-sized unnotched Charpy specimens would be ideal. From various joined tungsten heavy alloy parts as well as from the straight tungsten heavy alloy (no joint) parts, electro-discharge machined coring was used to extract around 9 mm×9 mm size parts whose length was around 75 mm (typically the length of the joined rods). These electro-discharge machined extracted cores were final machined to produce 8 mm×8 mm unnotched Charpy bars. These bars were tested in impact.

The absorbed energy in the best joined samples in Phase 1 was around 3 ft-lb while the parent heavy alloy examined in Phase I had a value of 94.1 ft-lb. Thus, the impact results for Phase I was indeed very poor. The Phase I process was of course not optimized at all but was simply a proof of the concept of producing parts by joining.

During Phase II, the parent tungsten heavy alloy showed an absorbed energy value of 90.5 ft-lb which was close to the value of the parent tungsten heavy alloy results of Phase I. The surprise was the improvement in the impact resistance values of the joined samples.

Impact testing was also carried out on samples at both low (−50° C.) and elevated (+150° C.) temperatures. These test results followed the expected trend. The low temperature tested samples showed a mean absorbed energy value of around 10 ft-lb while the high temperature samples had a mean absorbed energy value that was quite good (around 40 ft-lb). The best result, however, was surprisingly attained in the joints made by joining 6 inch hollow cylinders. The mean absorbed energy value was around 53.7 ft-lb. The variation was around 16.7 ft-lb.

Judging from the results, the Phase II optimization work was indeed a success for the impact properties of the joined WHA. The best Phase I joined samples had an absorbed energy value of 3 ft-lb which is significantly lower than most of the joints investigated in Phase II. The only joint that exhibited very poor impact properties was the 3 inch solid cylinder joints. This joint had also exhibited poor tensile properties too. The conclusion from this investigation is that the impact properties have been vastly improved during this Phase II investigation.

A study of the dynamic properties of the joined tungsten heavy alloys was also very encouraging. To study the dynamic properties of the joined tungsten heavy alloys, the joined samples were **EDM cored for machining the tensile bars. There were two types of tensile bars that were machined. Six tensile bars (3 from each of the two joints) were machined to the size of the normal tensile samples for the medium strain rate testing set. The other three bars (two samples extracted from SR-1/SR-2 and one sample from SR-3/SR-4) were machined into smaller tensile bars for the high strain rate testing in the Split Hopkinson Pressure Bar set up.

The set of six samples were tested at the medium strain rate of 1 s$^{-1}$. This strain rate was much higher than the quasi-static strain rate that was being used for all the earlier experiments (0.0001 s$^{-1}$). The other set of three samples were tested in the Split Hopkinson Pressure Bar. The strain rate achieved in the case of the high strain rate experiments was 1400 s$^{-1}$.

The results of the medium and high strain rate tests are shown in Table 2. This table also contains the results from the quasi static tests.

TABLE 2

Mechanical properties of joined tungsten heavy alloys tested at different strain rates.

| Sample | Joint Alloy Composition (weight percent) | Test Variables | YS ksi | UTS ksi | Elong. % | E Mpsi |
|---|---|---|---|---|---|---|
| BB1/BB2* 1 | 61.6Ni—36.7Cu—1.7Fe | New Target, Bead Blasting | 96.2 | 134.0 | 24 | 30.4 |
| BB1/BB2 2 | 61.6Ni—36.7Cu—1.7Fe | New Target, Bead Blasting | 95.8 | 134.2 | 22 | 29.8 |
| BB3/BB4 1 | 61.6Ni—36.7Cu—1.7Fe | New Target, Bead Blasting | 94.4 | 133.1 | 16 | 32.0 |
| BB3/BB4 2 | 61.6Ni—36.7Cu—1.7Fe | New Target, Bead Blasting | 92.7 | 130.8 | 25 | 30.1 |
| SR1/SR2 1 | 61.6Ni—36.7Cu—1.7Fe | Sand blasted strain rate 1 s−1 | 132.3 | 157 | 22 | 36.7 |
| SR1/SR2 2 | 61.6Ni—36.7Cu—1.7Fe | Sand blasted strain rate 1 s−1 | 129.4 | 159 | 22 | 35.6 |
| SR1/SR2 3 | 61.6Ni—36.7Cu—1.7Fe | Sand blasted strain rate 1 s−1 | 130.2 | 158 | 21 | 35.8 |
| SR3/SR4 1 | 61.6Ni—36.7Cu—1.7Fe | Sand blasted strain rate 1 s−1 | 131.6 | 160 | 23 | 38.0 |
| SR3/SR4 2 | 61.6Ni—36.7Cu—1.7Fe | Sand blasted strain rate 1 s−1 | 129.8 | 157 | 21 | 36.4 |
| SR3/SR4 3 | 61.6Ni—36.7Cu—1.7Fe | Sand blasted strain rate 1 s−1 | 132.3 | 158 | 21 | 38.3 |
| SR1/SR2 4 | 61.6Ni—36.7Cu—1.7Fe | Sand blasted strain rate 1400 s−1 | | 175.6 | 15 | |
| SR1/SR2 5 | 61.6Ni—36.7Cu—1.7Fe | Sand blasted strain rate 1400 s−1 | | 182.9 | 15 | |
| SR3/SR4 4 | 61.6Ni—36.7Cu—1.7Fe | Sand blasted strain rate 1400 s−1 | | 181.0 | 12 | |

*These samples failed not at the joint but away from it.

The medium and high strain rate test results are extremely encouraging. Generally in tungsten heavy alloys with increasing strain rates the strength of the alloy is increased while the tensile elongation decreases. This trend was followed for the joined samples also. However, in the case of the samples tested at the medium strain rates, the ductility was still greater than 20%, which can be considered to be extremely good. The strength of the joined material, however, was found to be significantly higher compared to both the joined sample and the parent heavy alloy tested under quasi-static conditions. The average ultimate tensile strength of the samples tested at the medium strain rate was found to be around 158 ksi which is significantly higher than that of the baseline tungsten heavy alloy which was around 136 ksi and the joined **WHA, which was around 133 ksi. Thus, it can be concluded that the joint material would not have any problems at medium stain rates.

The strain range of >$10^2$ sec$^{-1}$ exceeds the capabilities of the standard servo hydraulic test systems and such the performance of tensile and compression test in this regime requires the use of a Split Hopkinson Pressure Bar. The Split Hopkinson Pressure Bar tests carried out at high strain rates (1400 s$^{-1}$) showed a similar trend of decreasing tensile elongation and increased strength. The average tensile elongation was found to be around 14%. This was quite surprising as at these strain rates, as it was thought that the elongations would be significantly below 10%. The failure strength that was recorded was, however, the highest that has been recorded so far. The average ultimate tensile strength was found to be around 180 ksi, which was greater than 30% compared to that of the parent heavy alloy tested under the quasi-static test conditions. The increase in strength is expected as it also is observed in case of pure tungsten heavy alloy samples. However, it was not known how the joined samples would behave at the high strain rates. The tensile elongation of 14% was still greater than the minimum goal of 10%. Thus, the joined alloy would also work well and should hold together even under dynamic conditions. This was indeed a very positive finding.

It is recognized that this application encompasses alternate forms of joining such as the use of targeted heating of the specific zones that are being joined. Examples of such heating methods include induction heating, IR heating, electron beam heating, etc. Care still has to be taken to ensure that the heated areas or preferably the complete structure is under the protection of a reducing gas and/or inert gas.

REFERENCES

1 C. J. Smithells, Nature, Vol. 139, p. 490, 1937.
2 J. C. Mclennan and C. J. Smithells, J. Sci. Inst., Vol. 12, p. 159, 1935.
3 G. H. S. Price, C. J. Smithells, and S. V. Williams, J. Inst. Metals, Vol. 62, p. 239, 1938.
4 B. C. Muddle, Metall. Trans., Vol. 15A, p.1089, 1984. N. M. Parikh, Annor Research Foundation Technical Report, Watertown Arsenal, Watertown, Mass., Report ARF 2182-12, WAL 372/32, Mar. 23, 1961.
5 B. H. Rabin, A. Bose, and R. M. German, Microstructural Sdence, Vol. 15, p. 285, 1986.
L. S. Magness and T. G. Farrand, Proc. 1990 Anny Science Conf., Durham, N.C., p. I49, 1990.
7 A. Bose, D. Kapoor, L. S. Magness, R. J. Dowding, Tungsten, Refractory Metals and Alloys4, Eds. A. Bose and RJ. Dowding, p. 321, 1998.
8 A. Bose, R. J. Dowding, and G. Allen, PIM 92, p. 261, 1992
9 A. Bose and R M. German, Metall. Trans., Vol. 19A, No. 12, p. 3000, 1988.
10 C. M. Khipput, A. Bose, S. Farooq, and R. M. German, Metall. Trans., Vol. 19A, No. 8, p. 1905, 1988.
11 R M. German, Inter. J. Powder Metall., Vol. 26, p. 23, 1990.
12 S. C. Hardy and P. W. Voorhees, Metall. Trans., Vol. 19A, p. 2713, 1988.
13 S. S. Mani and R. M. German, Advances in Powder Metallurgy, Vol. 4, p. 195, 1991.
14 R. M. German, Advances in Powder Metallurgy, Vol. 4, p. 183, 1991.
15 R. G. Iaeocca, Y. Liu, and R M. German, Advances in Powder Metallurgy and Particulate Materials, VoL 4, p. 4-239, 1995.

The invention claimed is:

1. A method for joining two or more sintered tungsten heavy alloys pieces, each having a joint area, the method comprising the steps of:
   forming a target material from a powder alloy, wherein the target material consists of 50 to 90 wt. % Ni or Co, 10 to 50 wt. % Cu, and 1 to 10 wt. % Fe;
   depositing the target material on the joint area by sputtering, thermal evaporation, electron beam evaporation or plasma vaporization; and
   joining the two or more sintered tungsten heavy alloy pieces, wherein the target material promotes significant diffusion across the joint area by forming a liquid phase.

2. A method for joining two or more sintered tungsten heavy alloys pieces, each having a joint area, the method comprising the steps of:
   forming a target material from a powder alloy, wherein the target material consists of 60 to 65 wt. % Ni, 30 to 35 wt. % Cu, and 1 to 5 wt. % Fe;
   depositing the target material on the joint area by sputtering, thermal evaporation, electron beam evaporation or plasma vaporization; and
   joining the two or more sintered tungsten heavy alloy pieces, wherein the target material promotes significant diffusion across the joint area by forming a liquid phase.

* * * * *